Patented July 20, 1926.

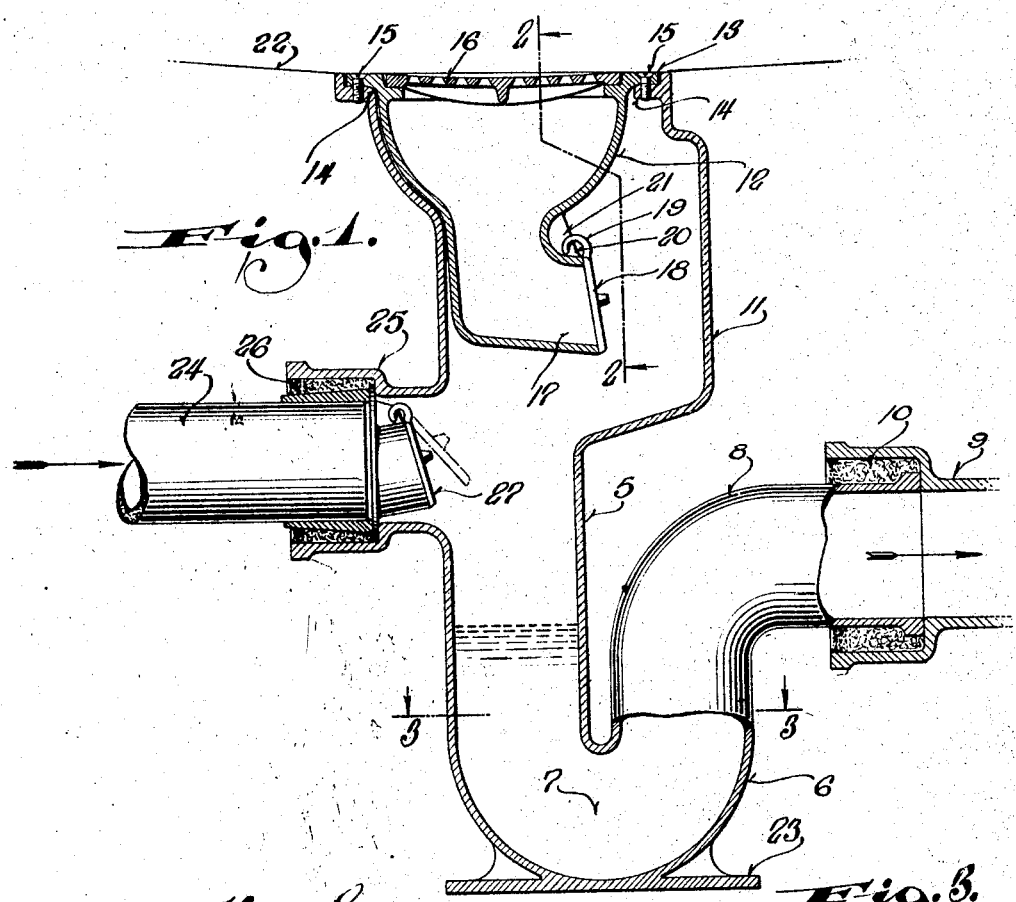

1,593,083

UNITED STATES PATENT OFFICE.

CHARLES O. KIRCHHAN, OF MILWAUKEE, WISCONSIN.

TRAP.

Application filed October 15, 1924. Serial No. 743,759.

This invention relates to certain new and useful improvements in traps and refers more particularly to drain traps.

It is one of the objects of this invention to simplify the construction of drain traps and provide means for facilitating their proper setting in position.

Another object of this invention is to provide a trap of the character described capable of joint use as a floor drain and drain tile receiver.

A further object of this invention resides in the provision of a trap of the character described having means for preventing the backing up of water through the floor drain.

A still further object of this invention resides in the provision of a trap of the character described in which the back-water valve for the floor drain may be readily removed and the trap utilized without the same.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawing, I have illustrated one complete example of the physical embodiment of my invention constructed according to the best mode I have so far devised for the practical application of the principles thereof, and in which:

Figure 1 is a view, partly in vertical section and partly in side elevation, of a trap embodying my invention;

Figure 2 is a fragmentary view, partly in section and partly in elevation, taken through Figure 1 on the plane of the line 2—2, and Figure 3 is a fragmentary view taken transversely through Figure 1 on the plane of the line 3—3.

Referring now more particularly to the accompanying drawing in which like numerals designate like parts throughout the several views; the numeral 5 designates a casting which is preferably formed in one piece and has a U-shaped bottom 6 forming a trap chamber 7, the outlet end 8 of which is directed laterally for connection with the house drain by a suitable duct or pipe 9 by a water tight joint 10.

The inlet end of the trap extends directly upwardly and is enlarged, as at 11, at a point above the plane of the outlet 8 to accommodate a bowl or insert 12 which is secured in the upper end thereof. The bowl 12 is provided with a flange 13 on its peripheral edge which engages or rests on a rib or ledge 14 on the upper end of the enlargement 11 and to which it is secured by screws or other means 15. The top of the bowl 12 is closed by a removable grate or perforated cover 16 and the lower end thereof is reduced and provided with a side outlet 17 which is disposed transversely of the casing to permit its being normally closed by a gravity or flap valve 18. The valve 18 is hung in position by a pair of spaced loops or hooks 19 on its upper end which engage over a pair of lugs or tits 20 positioned on opposite sides of a spacer 21.

The trap is set in place with the floor of the basement or other place, indicated by the line 22, on a line with the top of the grating 16, the drain water entering the bowl 12 through the grating and into the trap past the valve 18 which is readily swung open by the weight of the water. In the event the water backs up from the house drain to a heighth above the outlet 17, valve 18 is held closed preventing the water from flowing onto the floor 22, as will be readily apparent. The proper setting of the trap is facilitated by an enlarged rest or foot 23 formed on the bottom thereof which permits its being readily positioned with a minimum of effort.

The drain tile may also be connected with the trap 5, at a point above the normal water level within the trap by a duct or pipe 24 which enters the trap through an inlet 25. The inner end of the duct 24 is secured in place by a suitable packing 26 and is normally closed by a gravity valve 27 which is substantially identical with that described in my co-pending application filed October 27, 1922, Serial Number 597,421.

From the foregoing description taken in connection with the accompanying drawing it will be readily obvious to those skilled in the art to which an invention of this character appertains that I provide a drain trap which is of extremely simple construction; may be easily secured in place; which will prevent the backing up of water onto the floor or into the drain tile receiver and one in which the back water valves may be readily eliminated if desired.

What I claim as my invention is:

A device of the character described composed of a U-shaped member, one end of which is directed laterally to provide an outlet and the other end being extended upwardly above the outlet end, said extended end having therein an enlarged portion, a bowl positioned within the extended end and discharging into the enlarged portion of said end, valve means normally closing the discharge end of the bowl, a drain tile receiver communicating with the inlet side of the U-shaped member on a plane higher than the outlet thereof, and means normally closing said drain tile receiver.

In testimony whereof I affix my signature.

CHARLES O. KIRCHHAN.